April 14, 1964 W. P. MASON 3,129,395
PULSE GROUP GENERATOR PRODUCING TIME SPACED OUTPUT
PULSES IN DEPENDENCE ON SPATIAL DISTRIBUTION
OF MAGNETIC TRANSDUCERS ALONG DELAY LINE
Filed Nov. 13, 1959 2 Sheets-Sheet 1

INVENTOR
W. P. MASON
BY
*H. O. Wright*
ATTORNEY

April 14, 1964 W. P. MASON 3,129,395
PULSE GROUP GENERATOR PRODUCING TIME SPACED OUTPUT
PULSES IN DEPENDENCE ON SPATIAL DISTRIBUTION
OF MAGNETIC TRANSDUCERS ALONG DELAY LINE
Filed Nov. 13, 1959 2 Sheets-Sheet 2

INVENTOR
W. P. MASON
BY
ATTORNEY

United States Patent Office 3,129,395
Patented Apr. 14, 1964

3,129,395
PULSE GROUP GENERATOR PRODUCING TIME SPACED OUTPUT PULSES IN DEPENDENCE ON SPATIAL DISTRIBUTION OF MAGNETIC TRANSDUCERS ALONG DELAY LINE
Warren P. Mason, West Orange, N.J., assignor to Bell Telephone Laboratories, Incorporated, New York, N.Y., a corporation of New York
Filed Nov. 13, 1959, Ser. No. 852,725
1 Claim. (Cl. 333—30)

This invention relates to pulse generating methods, to pulse generators and to delay lines. More particularly, it relates to methods and arrangements employing magnetostrictive pulse generating means.

Numerous delay line arrangements of the prior art employ magnetostrictive pulse generating means. However, all such arrangements are designed to generate longitudinal acoustic or ultrasonic waves in the associated delay line. While satisfactory for some purposes, short pulses of longitudinal waves suffer dispersion effects and do not produce as faithful a reproduction of the signal as torsional waves.

Accordingly, it is a primary object of the present invention to increase the efficiency of the pulses generated by magnetostirictive means and of the delay lines with which they are used.

Another object is to increase the facility and efficiency with which groups of pulses having predetermined inter-pulse time intervals can be generated.

A further object is to simplify the apparatus required and reduce the cost of magnetostrictive pulse generating apparatus.

The higher efficiencies of arrangements of the invention are realized by generating torsional vibratory acoustic or ultrasonic wave pulses instead of the lower efficiency longitudinal vibratory acoustic or ultrasonic wave pulses.

Another outstanding advantage of arrangements of the invention, in addition to their simplicity, is their extreme flexibility and ease of adjustment for any of numerous and varied modes of operation.

The above and other objects, features and advantages of the invention will become apparent during the course of the following detailed description of specific illustrative embodiments of the invention exemplified in the accompanying drawings in which.

Figure 1:
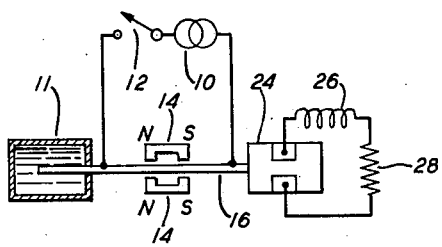
FIG. 1 illustrates in diagrammatic form a simple arrangement for generating and utilizing torsional vibratory acoustic wave pulses in a magnetostrictive wire or rod.

In more detail in FIG. 1, element 16 is a section of a wire or a rod of magnetostrictive material. A pair of permanent magnets 14 are arranged adjacent element 16 as shown to magnetize the portion of element 16 between the ends of magnets 14 in a direction substantially parallel to the longitudinal axis of member 16.

An alternating current generator 10 which can, for example, preferably have a frequency of ten kilocycles to one megacycle is connected through a switching device 12 to points on element 16 to the left and right of magnets 14, respectively, as shown.

An electromechanical transducer 24, designed in accordance with conventional practice widely used by those skilled in the art so that in conjunction with series inductance 26 and utilization device 28 which comprise its electrical output circuit it will match the mechanical impedance of element 16, is mechanically connected to the right end of wire or rod 16. Suitable transducers, for example, are those described and claimed in applicant's Patents 2,880,334, granted March 31, 1959, and 2,828,470 (FIGS. 5 and 6), granted March 25, 1958. The left end can be terminated in an impedance matching, energy absorbing arrangement 11 such as a mass of beeswax or highly viscous grease suitably housed in an enclosing member, numerous forms of which are well known in the art. (See, for example, United States Patent 2,837,721, granted June 3, 1958, to R. Millership.) Impedance matching termination devices at both ends of element 16 are, of course, preferable to eliminate reflections of energy which can cause serious interference with the energy impulses of primary interest in the utilization of the contemplated type of structure. Alternatively, a second transducer with appropriate output electrical circuit can be mechanically connected to the left end of element 16, also, as for the arrangements illustrated in FIGS. 2 and 4, to be described in detail hereinunder.

Switch 12 can be manually operated or, alternatively, it can be of any of the numerous types of electromechanical or electronic switching devices well known and extensively used by those skilled in the art. Its function is to impress short impulses (for example impulses having a duration of one to 100 microseconds) of alternating current from source 10 upon the portion of element 16 along which magnets 14 are situated, as shown. Where it may be desirable to move the unidirectional magnetizing means, such as magnets 14, along the wire or line to change the delay of the pulse in reaching the transducer at the end of the line, it is obviously convenient to pass the alternating current through a length of the magnetostrictive element sufficient to include all positions to which the magnets may be moved. Upon the passage of the short alternating current pulse through the portion of element 16 adjacent magnets 14, the longitudinally magnetized portion of element 16 will vibrate torsionally to produce a corresponding torsional acoustic or ultrasonic wave pulse. This torsional acoustic wave pulse will travel in both directions along element 16 from magnets 14. Being essentally a transverse type of wave motion, the torsional pulses will have a speed of propagation along the line of approximately one-half of that of longitudinal pulses so that the length of the line required for a given delay will be only half that which would be required if longitudinal pulses were employed. The energy traveling toward the left will be absorbed in termination 11 and that traveling toward the right will actuate transducer 24 to produce a corresponding electrical impulse in the output circuit comprising series coil 26 and utilization device 28. Series coil 26 resonates with the distributed capacity of transducer 24 at the frequency of the torsional acoustic wave pulse. Utilization device 28 can be, for example, any device responsive to an electrical impulse which will produce an indication or actuate some other electrical circuit as, for example, by momentarily unblocking a radio-receiving circuit.

The overall arrangement of FIG. 1 can, accordingly, comprise means responsive to a momentary alternating current impulse from source 10 which generates an electrical impulse in utilization device 28 at a time interval following the initial momentary impulse determined mainly by the delay or time required for the torsional acoustic wave pulse to travel from the position of magnets 14 to the right end of element 16. The pair of magnets 14 can obviously be moved along member 16 to either increase or decrease the time interval. Magnets 14 are preferably substantially one-half wavelength long of the acoustic or ultrasonic wave generated in response to the impulse from source 10.

Figure 2:
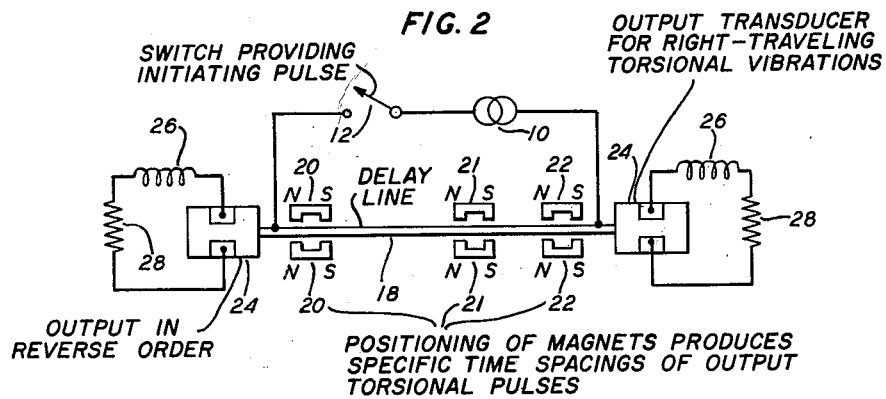
FIG. 2 illustrates in diagrammatic form one arrangement for generating and utilizing a plurality of torsional vibratory acoustic wave pulses at spaced points along a magnetostrictive wire or rod with transducers at each end of the rod.

The arrangement illustrated in FIG. 2 is obviously quite similar to that of FIG. 1 except that it has a longer magnetostrictive member 18 and three pairs of magnets 20 through 22 inclusive, respectively, disposed along it at irregular intervals as shown. It also has two transducers 24 with their respective associated electrical output circuits, each comprising a tuning inductance 26 and a utilization device 28, one of the transducers being connected to each end of member 18.

Figure 3:
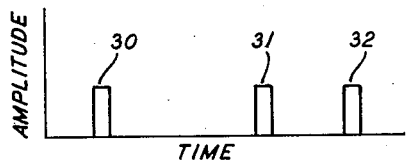
FIG. 3 illustrates a group of pulses which may be generated by the arrangement illustrated in FIG. 2.

Accordingly, the structure of FIG. 2 will generate three torsional acoustic wave pulses in member 18 in response to a single momentary impulse from source 10, the pulses originating, of course, at the positions of the three pairs of magnets, respectively. These three acoustic wave pulses are indicated in the time versus amplitude diagram of FIG. 3 by pulses 30, 31 and 32, respectively. Since they travel in both directions along member 18 from their respective magnet pair positions, the left transducer 24 will receive pulse 30 first with pulses 31 and 32 arriving at subsequent intervals determined by the respective distances from right to left which they must travel to reach the left transducer.

Similarly, the transducer 24 at the right will receive pulse 32 first with pulses 31 and 30 arriving at subsequent intervals determined by the respective distances from left to right which they must travel to reach the right transducer.

Obviously, the structure of FIG. 2 can therefore simultaneously generate two groups of three pulses each having interpulse intervals which within the two groups bear a type of "inverse" relationship to each other, as described above and as illustrated in FIG. 3. Utilization devices 28 can obviously be independent circuits. Alternatively, appropriate switching circuits (not shown) can readily be provided to permit the selection of either one of the pulse groups for use in a preselected single utilization circuit. If only one active utilization circuit is to be used, the other can be a resistive termination which together with its associated transducer 24 and tuning inductance 26 can serve as an impedance matching termination for its respective end of element 18 and thus eliminate reflections from its end of element 18.

The intervals between magnet pairs and between either transducer and its adjacent magnet pair can obviously be readily changed to produce a large number of different three-pulse code groups, as may be desired. Additional pairs of magnets can, of course, be placed along wire 18 to provide code pulse groups containing more than three pulses in each group.

The arrangement illustrated in FIG. 4 is again similar in its major aspects to that of FIG. 2 except that seven magnet pairs 40 through 46, inclusive, respectively, are arranged along the magnetostrictive element 19, and the magnet pairs are electromagnets which must be energized as shown from a battery 48 or other suitable source of direct current.

Thus by closing various selected switches only of the switches 50 through 56, inclusive, it is obvious that any of a very large number of distinctively differing multiple pulse code groups can be obtained at either end of element 19 and the "inverse" of each group at the other end of element 19. If all the switches 50 through 56, inclusive, are closed, a total of seven pulses such as pulses 60 through 66, inclusive, of FIG. 5 will be obtained for each pulse from source 10. The pulses may be spaced at like intervals, as shown, or alternatively the interpulse intervals may be made distinctively different by merely rearranging the positions of their respective generating electromagnets along element 19 in any manner desired. Obviously, as mentioned above, a single pulse from source 10 will generate the complete pulse group for which the switches 50 through 56, inclusive, of the arrangement of FIG. 4 have been adjusted.

Reversing switch 57 is preferably interposed in the battery output leads so that remanent magnetization of any portions of element 19 can be removed by momentarily reversing the direction of the fields of the electromagnets, as may become necessary after repeated use.

Figure 4:
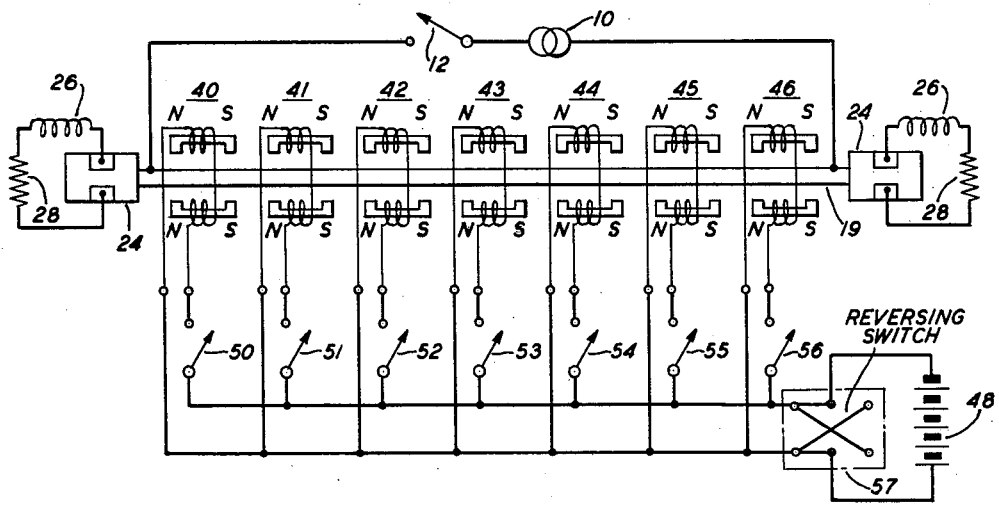
FIG. 4 illustrates in diagrammatic form a second embodiment of particular principles of the invention.
Figure 5:
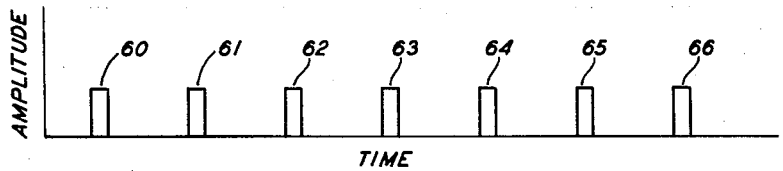
FIG. 5 illustrates a full group of pulses which can be generated by the arrangement illustrated in FIG. 4.

Pulse code groups of the types readily generated by the arrangements illustrated in FIGS. 2 and 4 can obviously be employed to advantage in numerous and varied systems as, for example, in radio pulse code group calling systems of the types illustrated and claimed in the copending joint application of H. W. Bode and H. J. McSkimin, Serial No. 487,686, filed February 11, 1955, and assigned to applicant's assignee. This application matured as Patent 2,955,279, granted October 4, 1960. Other systems employing similar pulse code groups are described in United States Patents 2,800,584, granted July 23, 1957, to R. F. Blake, and 2,706,810, granted April 19, 1955, to A. B. Jacobson.

Obviously, in instances where it is desired that pulses should originate from specific portions of the line only, remaining portions of the line can be of non-magnetostrictive conductive material, such for example as copper, silver, aluminum or the like. In such a case, care should be taken to see that at all junctions between magnetostrictive and non-magnetostrictive line portions the impedances of the portions joined should match each other. Alternatively, the entire line can be of non-magnetostrictive material and portions at which pulses are to be generated can be plated with magnetostrictive material. (See patent to Millership cited above.)

Obviously space may be conserved where the length of the line is large by coiling the line in helical or spiral form as taught, for example, in the above-mentioned patent to Millership.

Figure 6:
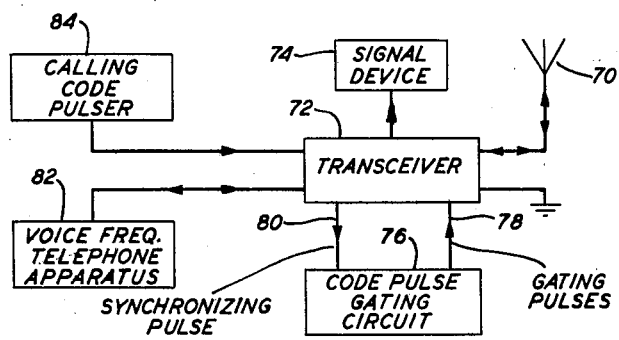
FIG. 6 is an electrical schematic block diagram of a radio station employing pulsers of the invention.

In the block diagram of FIG. 6 a station of a radio system utilizing pulsers of the invention is illustrated. Antenna 70 is connected to transceiver 72. Each station is assigned a specific code group of pulses. Code pulse gating circuit 76 is arranged to respond to a synchronizing pulse over conductor 80 from transceiver 72, which latter pulse can, for example, be the first pulse of an incoming code group of pulses. Upon receipt of such a synchronizing pulse, gating circuit 76 will send a replica of the remainder of the code group of pulses assigned to the station over lead 78 to transceiver 72. These pulses can then be employed as gating pulses to unblock a receiving circuit in transceiver 72 for the duration of each gating pulse. Accordingly, if the successive pulses of an incoming code group of pulses coincide with the successive gating pulses from gating circuit 76, respectively, they will pass through the receiving circuit to a signal device 74 and actuate it to operate a light or sound a bell or the like.

Upon receipt of such a signal, the operator can employ voice frequency telephone apparatus 82 to communicate with the operator at the station from which the call originated. If the operator wishes to call another station he may set up the code group of pulses assigned to the station he wishes to call in the calling code pulser 84. Obviously, pulsers of the type illustrated in FIG. 4 and described in detail above can be readily adapted by those skilled in the art for use both as the code pulse gating circuit 76 and as the calling code pulser 84.

Pulser 84 provides the selected code pulse group to the transmitter in transceiver 72 and corresponding pulses are transmitted via antenna 70 to the called station to operate the signal device at that station.

Numerous and varied other arrangements and modifications of the above-described illustrative arrangements can readily be devised by those skilled in the art without departing from the spirit and scope of the invention.

What is claimed is:

In combination, an elongated wire of magnetostrictive material, a plurality of means for unidirectionally magnetizing a like plurality of short lengths of the wire spaced along the wire intermediate its ends, means for transmitting an alternating current pulse along a portion of the wire which includes all of the unidirectionally magnetized short lengths of the wire, means mechanically connected to a first end of the wire and responsive to torsional vibratory energy pulses to generate electrical pulses, and a second means mechanically connected to the other end of the wire and responsive to torsional vibratory energy pulses to generate electrical pulses, the said responsive means at each end of the wire having a mechanical impedance matching the mechanical impedance of the wire, the magnetized length of the magnetostrictive wire in each instance being substantially one-half wavelength long with respect to the wavelength of the vibratory torsional acoustic wave in the wire.

References Cited in the file of this patent

UNITED STATES PATENTS

| | | |
|---|---|---|
| 2,495,740 | Labin | Jan. 31, 1950 |
| 2,549,578 | Curtis | Apr. 17, 1951 |
| 2,612,603 | Nicholson | Sept. 30, 1952 |
| 2,736,881 | Booth | Feb. 28, 1956 |
| 2,790,160 | Millership | Apr. 23, 1957 |
| 2,815,490 | Taymoceau | Dec. 3, 1957 |
| 2,828,470 | Mason | Mar. 25, 1958 |
| 2,854,593 | Hobrough | Sept. 30, 1958 |
| 2,863,120 | Powell | Dec. 2, 1958 |
| 2,906,971 | Mason et al. | Sept. 29, 1959 |
| 2,914,757 | Millership et al. | Nov. 24, 1959 |
| 2,926,217 | Powell | Feb. 23, 1960 |
| 2,946,968 | Faulkner | July 26, 1960 |
| 3,016,524 | Edmunds | Jan. 9, 1962 |
| 3,027,468 | Hill et al. | Mar. 27, 1962 |
| 3,078,426 | Foundas | Feb. 16, 1963 |

FOREIGN PATENTS

| | | |
|---|---|---|
| 758,647 | Great Britain | Oct. 10, 1956 |

OTHER REFERENCES

Electronics, "Circuit Design Using Magnetostrictive Filters," by A. P. Thiele, June 19, 1959. Pages 72–74.

Proceedings of The I.R.E., "A Torsional Magnetostrictive Delay Line," by A. Rothbart, vol. 47, No. 6, June 1959, pages 1153–1154.